United States Patent [19]

Cheng et al.

[11] 4,242,493
[45] Dec. 30, 1980

[54] METHOD OF PREPARING SUBSTANTIALLY PURE POLYHALOPHENOXYPHOSPHAZENE HOMOPOLYMERS AND COPOLYMERS

[75] Inventors: Tai C. Cheng, Akron; John R. Schreffler, Clinton, both of Ohio

[73] Assignee: The Firestone Tire & Rubber Company, Akron, Ohio

[21] Appl. No.: 31,579

[22] Filed: Apr. 19, 1979

[51] Int. Cl.³ .................. C08G 79/02; C08G 79/04; C08G 79/14
[52] U.S. Cl. .................................. 528/168; 528/399
[58] Field of Search ........................................ 528/168

[56] References Cited

U.S. PATENT DOCUMENTS

| | | | |
|---|---|---|---|
| 2,876,247 | 3/1959 | Rätz et al. | 260/461 |
| 3,453,235 | 7/1969 | Klender et al. | 260/47 |
| 3,459,838 | 8/1969 | Klender et al. | 260/973 |
| 3,883,451 | 5/1975 | Reynard et al. | 528/168 |
| 4,128,710 | 12/1978 | Fieldhouse et al. | 528/168 |

Primary Examiner—Edward M. Woodberry

[57] ABSTRACT

A method of producing substantially pure polyhalophenoxyphosphazene homopolymers or copolymers which are free from phenoxy groups formed by reduction of halophenols is provided. The method involves as a first step preparing a substantially pure sodium salt of a halogen-substituted phenol (in the case of homopolymers) or the substantially pure sodium salts of a mixture of a halogen-substituted phenol and an alkyl or alkoxy-substituted phenol, alkanol, or fluoroalkanol (in the case of copolymers) by reacting said halogen-substituted phenol or mixture with sodium hydride. Following this procedure, the resultant sodium salt or salts are reacted with a poly(dichlorophosphazene) of the formula $(NPCl_2)_n$, in which n is from 20 to 50,000, to produce a mixture of polyhalophenoxyphosphazene homopolymer or copolymer and sodium chloride. The sodium chloride is then separated from the mixture to produce a substantially pure polyhalophenoxyphosphazene homopolymer or copolymer which is free from phenoxy groups.

12 Claims, No Drawings

METHOD OF PREPARING SUBSTANTIALLY PURE POLYHALOPHENOXYPHOSPHAZENE HOMOPOLYMERS AND COPOLYMERS

BACKGROUND OF THE INVENTION

The present invention relates to a method of preparing substantially pure polyhalophenoxyphosphazene homopolymers and copolymers. More particularly, the invention relates to a method of preparing such substantially pure polymers which involves preparing the salt or salts of a halogen-substituted phenol or a mixture of a halogen-substituted phenol and an alkyl or alkoxy-substituted phenol, alkanol or fluoroalkanol by reacting said halogen-substituted phenol or mixture with sodium hydride and then reacting the resultant salt or salts with a polydichlorophosphazene polymer.

Methods of preparing polyphosphazene homopolymers or copolymers which contain halophenoxy groups are known in the prior art as illustrated by, for example, U.S. Pat. Nos. 3,370,020; 3,856,712; and 3,883,451. However, the halophenoxy group-containing polyphosphazene homopolymers and copolymers produced by the process described in these patents are not pure polymers, but are in fact polymers containing mixtures of units of differing chemical structures. The reason for this is related to the method of preparing the alkali metal salt of the halogen-substituted phenol employed in such prior processes.

Thus, as described in the aforementioned patents, the polymers are prepared by reacting a polydichlorophosphazene polymer with the alkali metal salt of a halogen-substituted phenol in the case where homopolymers are desired or the alkali metal salts of a mixture of a halogen-substituted phenol and a nonhalogen-substituted phenol in cases where a copolymer is desired. Moreover, as further described in the above patents, the alkali metal salt of the halogen-substituted phenol is prepared by reacting the halogen-substituted phenol with an alkali metal especially sodium. However, the use of an alkali metal to form the alkali metal salt of a halogen-substituted phenol does not result in the production of a single salt but in actuality results in the preparation of a mixture of salts. For example, the use of sodium metal to produce the sodium salt of p-chlorophenol results in the production of a mixture of sodium salts consisting of sodium p-chlorophenoxide and sodium phenoxide. The reason for this is that sodium metal will reduce a proportion of the p-chlorophenol to phenol by means of an electron transfer process.

Accordingly, attempts to prepare a polyhalophenoxyphosphazene homopolymer using an alkali metal salt prepared by such prior processes will, in fact, result in the preparation of a polymer containing a mixture of units of different chemical structures. Hence, for example, attempts to produce a polyphosphazene homopolymer containing p-chlorophenoxy groups in which the sodium salt of p-chlorophenol is produced by reaction with sodium metal as in prior processes will result in the production of a polymer containing a mixture of units of the structure:

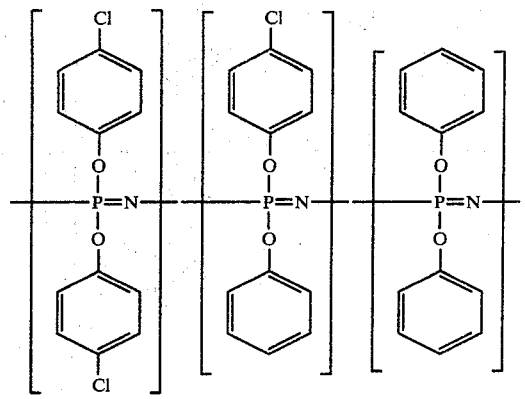

In essence, the above polymer would be regarded as a copolymer rather than a homopolymer. Similarly, polyphosphazene copolymers containing polyhalophenoxy groups prepared by such processes would also contain mixtures of units in which additional phenoxy groups formed by reduction of halophenol are present.

In contrast to the processes of the prior art, the process of the present invention permits the production of substantially pure polyhalophenoxyphosphazene homopolymers and copolymers which do not contain such additional phenoxy groups.

SUMMARY OF THE INVENTION

In accordance with the present invention, a process is provided for preparing substantially pure polyhalophenoxyphosphazene homopolymers and copolymers which are free from phenoxy groups formed by reduction of halophenols.

The homopolymers produced by the method of the invention may contain from 20 to 50,000 units represented by either of the formulas:

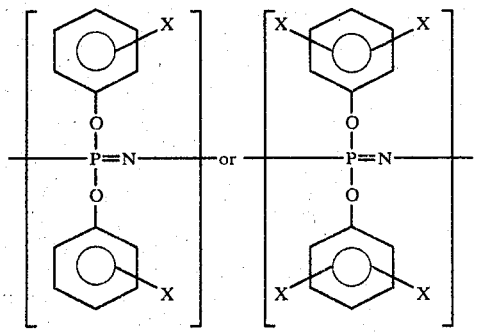

wherein X is fluorine, chlorine, bromine or iodine.

The copolymers produced by the method of the invention may contain from 20 to 50,000 units represented by the formulas:

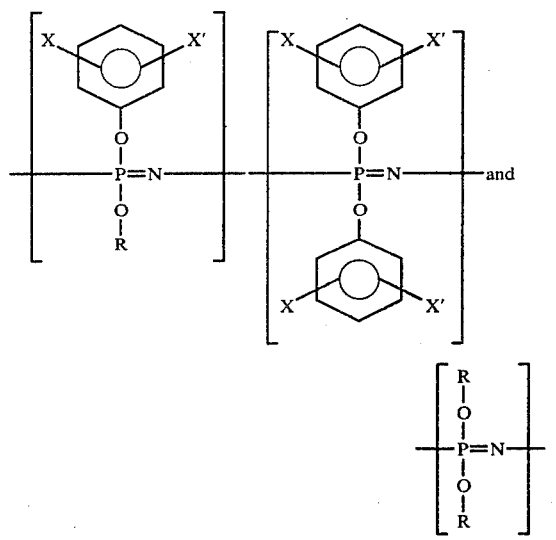

wherein X is as defined above and X' is X or hydrogen and wherein R is an alkyl, fluoroalkyl or

group in which $R_1$ is alkyl or alkoxy.

The copolymers produced by the method of the invention may contain small amounts (i.e., about 20 mole percent or less) of units in addition to the units described above. Examples of these additional units are:

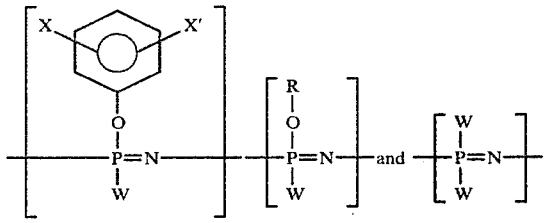

wherein X, X' and R are as previously defined and W represents a group capable of a crosslinking chemical reaction such as an olefinically unsaturated, preferably ethylenically unsaturated, monovalent oxy radical capable of further reaction at a wide range of temperatures (e.g. 25°–350° F). Illustrative of W groups which may be present in these additional units are olefinically unsaturated monovalent oxy radicals such as —OCH=CH$_2$, —OCR$^2$=CH$_2$, —OR$^3$CH=CH$_2$, —OR$^3$CF=CF$_2$, —OR$^3$R$^4$, and similar groups which contain unsaturation; wherein R$^2$ is any aliphatic or aromatic radical; wherein R$^3$ is alkylene or arylene and R$^4$ is vinyl, allyl, crotyl or the like. Of these groups, an especially preferred olefinically unsaturated group is ortho-allylphenoxy. Cure site groups represented by W and methods of curing polymers containing such units are known in the art as illustrated by U.S. Pat. Nos. 3,888,799; 3,702,833 and 3,844,983, the disclosures of which are incorporated herein by reference.

As will be seen from the above formulas, the method of this invention produces polymers which are free of phenoxy groups formed by reduction of halophenols.

The method involves as a first step preparing a substantially pure sodium salt of a halogen-substituted phenol (in the case of homopolymers) or the substantially pure sodium salts of a mixture of a halogen-substituted phenol and an alkyl or alkoxy-substituted phenol, alkanol of fluoroalkanol (in the case of copolymers) by reacting said halogen-substituted phenol or mixture with sodium hydride. Then, the resultant sodium salt or salts are reacted with a poly(dichlorophosphazene) of the formula (NPCl$_2$)$_n$, in which n is from 20 to 50,000 to produce a mixture of the polyhalophenoxyphosphazene homopolymer or copolymer and sodium chloride. Upon removal of the sodium chloride from the mixture, a substantially pure polyhalophenoxyphosphazene homopolymer or copolymer is obtained which is free of phenoxy groups formed by reduction of halophenol.

The substantially pure polyhalophenoxyphosphazene homopolymers and copolymers produced by the method of the invention will exhibit more uniform physical properties. Moreover, in view of the fact that the process of the invention prevents loss of halogen groups by reduction of halophenols, these polymers retain higher amounts of halogen and, therefore, should exhibit improved flame retardant properties and lower smoke densities.

DETAILED DESCRIPTION OF THE INVENTION

As indicated above, the first step in preparing substantially pure polyhalophenoxyphosphazene homopolymers and copolymers by the process of the invention involves the preparation of a substantially pure sodium salt of a halogen-substituted phenol in cases where a homopolymer is desired or the substantially pure sodium salts of a mixture of a halogen-substituted phenol and an alkyl or alkoxy-substituted phenol, alkanol or fluoroalkanol in cases where a copolymer is desired. This is accomplished by reacting the halogen-substituted phenol or mixture with sodium hydride.

Various halogen-substituted phenols may be employed in forming the sodium salt by reaction with sodium hydride. These include monohalogen-substituted and polyhalogen-substituted phenols. Illustrative of halogen-substituted phenols which may suitably be employed include monohalogen-substituted phenols such as para, meta and ortho; fluoro-, chloro-, bromo- and diodophenols and polyhalogen-substituted phenols such as 2,4-difluoro, dichloro-, dibromo- and diodophenols and the like.

Alkyl or alkoxy-substituted phenols which may be employed in the mixtures include the alkyl phenols such as the para, meta and ortho alkyl phenols including para, meta and ortho methyl, ethyl, propyl, butyl, and hexyl phenols and the like and the alkoxy phenols such as para, meta, ortho methoxy, ethoxy, propoxy, butoxy, hexoxy phenols and the like. More than one alkyl or alkoxy group can be attached to the phenyl radical.

Alkanols which may be employed in the mixtures are aliphatic alcohols having from 1 to 10 carbon atoms such as methanol, ethanol, propanol, isopropanol, n-butanol, sec-butanol, hexanol, dodecanol and the like.

Fluoroalkanols which may be employed in the mixtures are those represented by the formula Z(CH$_2$)$_n$CH$_2$OH in which Z is hydrogen or fluoride and n is an integer from 1 to 10 as illustrated by trifluoroethanol; 2,2,3,3,3-pentafluoropropanol; 2,2,3,3,4,4,4-heptafluorobutanol; 2,2,3,3,3-tetrafluoropropanol; 2,2,3,3,4,4,5,5-octafluoropentanol; 2,2,3,3,4,4,5,5,6,6,7,7-dodecafluoroheptanol and the like.

As mentioned above, the copolymers produced by the method of the invention may additionally contain small amounts of units which contain unsaturated groups. These may be incorporated into the copolymer by including an unsaturated aliphatic or aromatic alcohol in the above mixtures. Illustrative of unsaturated alcohols which may be included in the mixtures for that purpose are unsaturated aliphatic alcohols such as allyl alcohol, 3-butene-1-ol, 2,3,3-fluoropropen-1-ol and the like and unsaturated aromatic alcohols such as vinylphenols, allylphenols, eugenol, isoeugenol and the like.

The specific reaction conditions employed in reacting the halogen-substituted phenol or mixture with sodium hydride can vary somewhat. Thus, the reaction can be carried out at temperatures ranging from $-50°$ C. to $100°$ C., with a preferred range being from $27°$ to $40°$ C.

In addition, the reaction is ordinarily conducted in the presence of a suitable solvent. The solvent should be a solvent for both the halogen-substituted phenol or mixture and the sodium hydride. Suitable solvents which may be employed for the purpose include diglyme, triglyme, tetraglyme, tetrahydrofuran, toluene, and xylene.

The reaction between the halogen-substituted phenol or mixture and the sodium hydride is conducted using equimolar amounts of these compounds.

As mentioned heretofore, the second step of the process of the invention involves reacting the sodium salt of the halogen-substituted phenol or the sodium salts of the mixture with a poly(dichlorophosphazene) of the formula $(NPCl_2)_n$ in which n is from 20 to 50,000.

Poly(dichlorophosphazenes) which may be employed in the reacton are well known materials. Thus, these chloropolymers are in general prepared by the thermal polymerization of cyclic oligomers having the formula $(NPCl_2)_n$ in which n is an integer of from 3 to 7, with the cyclic trimer and tetramer often comprising up to 90% of the oligomers. As mentioned, these chloropolymers and their method of preparation are well known in the art and accordingly will not be discussed further herein. Preferred poly(dichlorophosphazenes) and their method of preparation are described in U.S. Pat. No. 4,005,171, the disclosure of which is incorporated herein by reference.

The specific reaction conditions employed in reacting the poly(dichlorophosphazene) and sodium salt or salts produced by the first step of the process can vary somewhat. In general, reaction temperatures may range from about $25°$ C. to about $200°$ C. and times may range from 3 hours to 7 days; lower temperatures necessitating longer reaction times and higher temperatures allowing shorter reaction times. These conditions are utilized in order to insure substantially complete conversion of the chlorine atoms in the chloropolymer to the corresponding ester of the sodium salt or salts.

The above reaction is ordinarily carried out in the presence of a solvent. The solvent or solvent mixture employed in the reaction should be a solvent for the poly(dichlorophosphazene) polymer and the sodium salt or salts. Solvents which may suitably be employed are those referred to above in the reaction relating to the preparation of the pure sodium salt or salts. It is usually preferred to employ the same solvent in this reaction as was utilized in the preparation of the sodium salt as this provides for a more uniform and efficient reaction. The amount of solvent or solvent mixture employed is not critical and any amount sufficient to solubilize the reaction mixture materials can be used.

In addition, the materials in the reaction zone should be reasonably free of water, most preferably containing 0.1 percent by weight of water or less. The prevention of water in the reaction system is necessary in order to inhibit the reaction of the available chlorine atoms in the chloropolymer therewith.

The amount of sodium salt or salts employed in the process should be at least molecularly equivalent to the number of available chlorine atoms in the chloropolymer. However, it is usually preferred to use an excess of such compounds in order to insure substantially complete reaction of all the available chlorine atoms in the chloropolymer.

The reaction between the sodium salt of the halogen-substituted phenol or the sodium salts of the mixture and the poly(dichlorophosphazene) results in the production of a mixture of polyhalophenoxyphosphazene homopolymer or copolymer and sodium chloride. Methods of separating sodium chloride from such mixtures are well known in the phosphazene art and, therefore, will not be discussed in detail herein. Thus, conventional methods of separation such as centrifugation, filtration and the like may be utilized.

The following examples are submitted for the purpose of further illustrating the nature of the present invention and are not intended as a limitation on the scope thereof. Parts and percentages referred to in the examples are by weight unless otherwise indicated.

The following examples (i.e., A through D) illustrate the effect of using sodium metal in the preparation of the sodium salt of p-chlorophenol in accordance with prior art processes.

EXAMPLES A–D

In these examples, a large excess of p-chlorophenol based upon the amount of sodium metal was employed in an attempt to prevent the reduction of p-chlorophenol to phenol. The individual examples were prepared by reacting 1 gram (0.0435 mole) of sodium metal and 11.56 grams (0.086 mole) of p-chlorophenol in tetrahydrofuran (hereinafter THF). Each example was reacted at a different temperature for four (4) hours and the degree of conversion was then determined. The resultant salts were then neutralized with HCl and analyzed. Reaction conditions and test results are shown in Table I.

TABLE I

| Ex. | Reaction Temperature | Reaction Time(hrs.) | % Conv. | Analysis by Gas Chromatography (after neutralizing with HCl) | |
|---|---|---|---|---|---|
| | | | | % phenol | % chlorophenol |
| A | $27°$ C. | 4 | 100 | 18.1 | 81.9 |
| B | $0°$ C. | 4 | 100 | 15.3 | 84.7 |
| C | $-20°$ C. | 4 | 100 | 13.1 | 86.9 |
| D | $-40°$ C. | 4 | <15 | 2.96 | 97.04 |

As can be seen from the above data, the use of sodium metal in preparing the sodium salt of p-chlorophenol results in the reduction of significant quantities of p-chlorophenol to phenol and the attendant formation of sodium phenoxide salt. It will be further noted (Example D) that this occurs even at very low conversions. Accordingly, this prior art process results in the production of mixtures of salts (i.e., mixtures of sodium phenoxide and sodium p-chlorophenoxide) and when this mixture of salts is reacted with a chloropolymer the resultant polymer will contain both chlorophenoxy and phenoxy groups.

The following examples (i.e., 1–5) illustrate the preparation of sodium salts of p-chlorophenol using sodium hydride in accordance with the process of the invention.

EXAMPLES 1–5

In this series of test examples, sodium salts of p-chlorophenol were prepared by reacting 1.0 grams (0.042 mole) of sodium hydride and 5.78 grams (0.045 mole) of p-chlorophenol in THF. The reaction temperatures and times were varied. A control example (Example A) was also prepared by reacting 1.0 grams (0.042 mole) of sodium metal and 5.78 grams (0.045 mole) of p-chlorophenol in THF. Following the reaction, the percent conversion was determined and the salts were then neutralized with HCl and the product analyzed. Reaction conditions and test results are shown in Table II.

TABLE II

| Ex. No. | Base | Reaction Temp.°C. | Reaction Time | % Conv. | Analysis by Gas Chromotography | |
|---|---|---|---|---|---|---|
| | | | | | % phenol | % chloro-phenol |
| A | Na | 27° C. | 16–17 hrs. | 100 | 17.5 | 82.5 |
| 1 | NaH | 27° C. | 40 min. | 100 | 0 | 100.0 |
| 2 | NaH | 0° C. | 2 hrs. | 100 | 0 | 100.0 |
| 3 | NaH | −20° C. | 2 hrs. | 100 | 0 | 100.0 |
| 4 | NaH | −40° C. | 2 hrs. | 100 | 0 | 100.0 |
| 5 | NaH | 60–70° C. | 2 hrs. | 100 | 0 | 100.0 |

As illustrated by the above data, the use of NaH in producing the sodium salts of p-chlorophenol results in a pure sodium salt of p-chlorophenol rather than a mixture of sodium salts of p-chlorophenol and phenol.

The following examples (i.e., 6 and 7) illustrate the preparation of substantially pure polyhalophenoxyphosphazene homopolymers by the process of the invention.

EXAMPLE 6

A large batch of sodium p-chlorophenoxide salt was prepared by the reaction of 529.4 grams (4.12 moles) of p-chlorophenol with 99.0 grams (4.12 moles) of sodium hydride in THF at room temperature. A light yellow solution was obtained after 2 hours. A sample of the salt was neutralized with HCl and analyzed. The analysis showed 100% p-chlorophenol.

The polyhalophenoxyphosphazene homopolymer was then prepared by reacting the above sodium p-chlorophenoxide salt with a poly(dichlorophosphazene) in a stainless steel reactor at 300° C. for 24 hours. In the reaction, a 10 percent molar excess of the salt was employed. A white crystalline material was obtained after removal of the sodium chloride by centrifugation.

EXAMPLE 7

In this example, the sodium salt of 2,4-dichlorophenol was prepared substantially in accordance with the procedure set forth in Example 6. As in Example 6, after neutralization of the salt with HCl, the product was analyzed and showed 100% 2,4-dichlorophenol.

The polyhalophenoxyphosphazene homopolymer in which the halophenoxy groups were 2,4-dichlorophenoxy was prepared following the procedure of Example 6.

We claim:

1. A method of preparing a substantially pure polyhalophenoxyphosphazene homopolymer which is free of phenoxy groups and which contains from 20 to 50,000 units represented by either of the formulas:

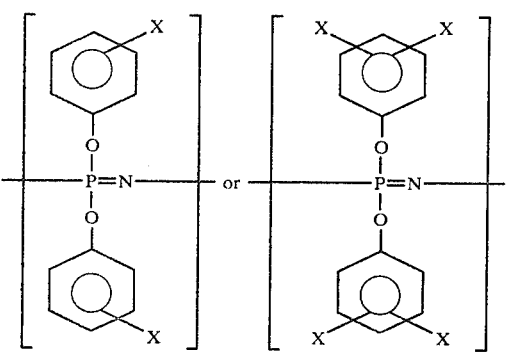

wherein X is fluorine, chlorine, bromine or iodine; said method comprising the steps of:
   (a) preparing a substantially pure sodium salt of a halogen-substituted phenol by reacting said halogen-substituted phenol with sodium hydride;
   (b) reacting said sodium salt with a poly(dichlorophosphazene) of the formula $(NPCl_2)_n$, wherein n is from 20 to 50,000 to form a mixture of said polyhalophenoxyphosphazene homopolymer and sodium chloride; and
   (c) separating the sodium chloride from said mixture thereby producing a substantially pure polyhalophenoxyphosphazene homopolymer.

2. The method of claim 1 wherein said halogen-substituted phenol is p-chlorophenol.

3. The method of claim 1 wherein said halogen-substituted phenol is 2,4-dichlorophenol.

4. A method of preparing a substantially pure polyhalophenoxyphosphazene copolymer which is free of phenoxy groups and which contains 20 to 50,000 units represented by the formulas:

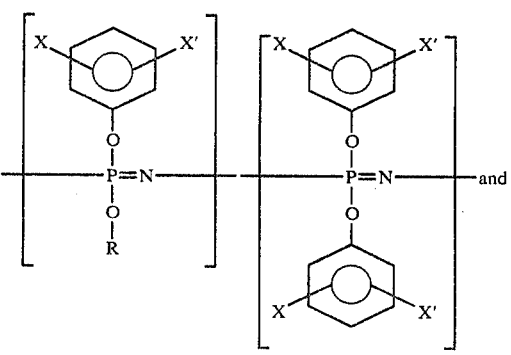

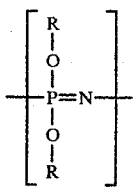

wherein X is fluorine, chlorine, bromine or iodine and X' is X or hydrogen and wherein R is an alkyl, fluoroalkyl or

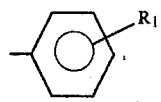

group in which $R_1$ is alkyl or alkoxy; said method comprising the steps of:
  (a) preparing the substantially pure sodium salts of a mixture of a halogen-substituted phenol and an alkyl or alkoxy-substituted phenol, alkanol or fluoroalkanol by reacting said mixture with sodium hydride;
  (b) reacting said sodium salts with a poly(dichlorophosphazene) of the formula $(NPCl_2)_n$, wherein n is from 20 to 50,000, to form a mixture of said polyhalophenoxyphosphazene copolymer and sodium chloride; and
  (c) separating the sodium chloride from said mixture thereby producing said substantially pure polyhalophenoxyphosphazene copolymer.

5. The method of claim 4 wherein said halogen-substituted phenol is p-chlorophenol.

6. The method of claim 4 wherein said halogen-substituted phenol is 2,4-dichlorophenol.

7. A method of preparing a substantially pure polyhalophenoxyphosphazene copolymer which is free of phenoxy groups and which contains from 20 to 50,000 units represented by the formulas:

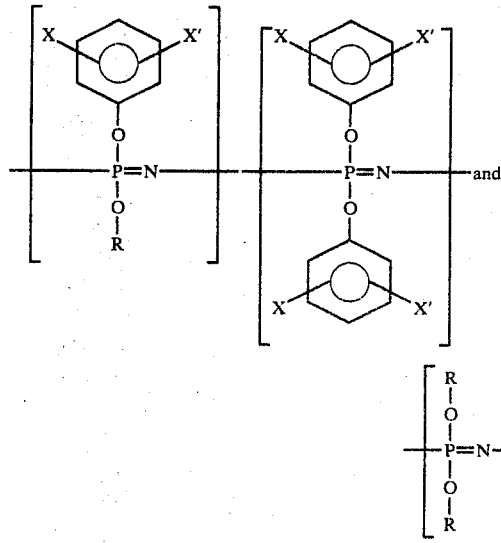

and which further contains a small amount of additional units represented by the formulas:

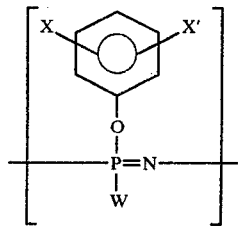

wherein X is fluorine, chlorine, bromine or iodine and X' is X or hydrogen, wherein R is an alkyl, fluoroalkyl or

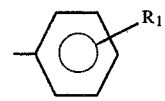

group in which $R_1$ is alkyl or alkoxy and wherein W is an olefinically unsaturated monovalent oxy radical capable of a crosslinking chemical reaction; said method comprising the steps of:
  (a) preparing the substantially pure sodium salts of a mixture of a halogen-substituted phenol and an alkyl or alkoxy-substituted phenol, alkanol or fluoroalkanol and an unsaturated aliphatic or aromatic alcohol by reacting said mixture with sodium hydride;
  (b) reacting said sodium salts with a poly(dichlorophosphazene) of the formula $(NPCl_2)_n$, wherein n is from 20 to 50,000, to form a mixture of said polyhalophenoxyphosphazene copolymer and sodium chloride; and
  (c) separating the sodium chloride from said mixture thereby producing said substantially pure polyhalophenoxyphosphazene copolymer.

8. The method of claim 7 wherein said halogen-substituted phenol is p-chlorophenol.

9. The method of claim 7 wherein said halogen-substituted phenol is 2,4-dichlorophenol.

10. The method of claim 7 wherein said unsaturated aromatic alcohol is ortho-allylphenol.

11. A substantially pure polyhalophenoxyphosphazene homopolymer which is free of phenoxy groups and which contains from 20 to 50,000 units represented by either of the formulas:

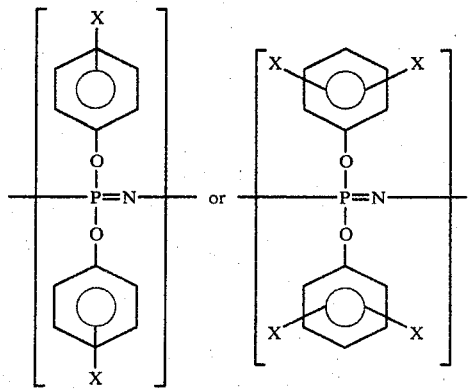

wherein X is fluorine, chlorine, bromine or iodine.

12. The homopolymer of claim 11 wherein X is chlorine.

* * * * *

UNITED STATES PATENT AND TRADEMARK OFFICE
CERTIFICATE OF CORRECTION

PATENT NO. : 4,242,493
DATED : December 30, 1980
INVENTOR(S) : Tai C. Cheng and John R. Schreffler It is certified that error appears in the above-identified patent and that said Letters Patent are hereby corrected as shown below:

Column 4, line 67

"fluoride" should read -- fluorine --

Signed and Sealed this

Twenty-fourth Day of March 1981

[SEAL]

Attest:

RENE D. TEGTMEYER

Attesting Officer     Acting Commissioner of Patents and Trademarks